Oct. 10, 1933.    J. H. McCOLLOUGH    1,929,436
VARIABLE PITCH PROPELLER
Filed March 11, 1931    3 Sheets-Sheet 2

INVENTOR
James H. McCollough
John A. Naismith
ATTORNEY

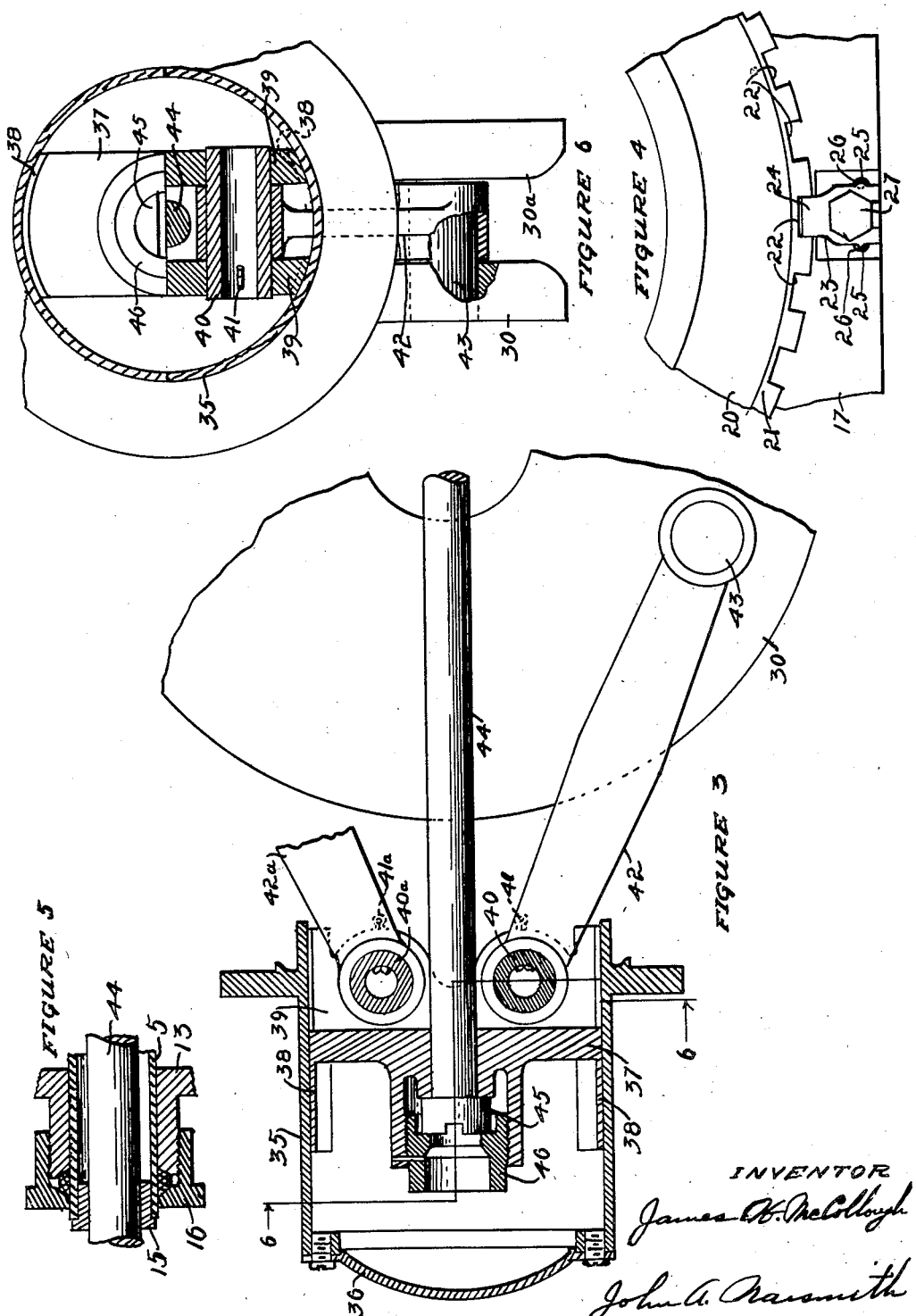

Patented Oct. 10, 1933

1,929,436

UNITED STATES PATENT OFFICE 1,929,436

VARIABLE PITCH PROPELLER

James H. McCollough, San Jose, Calif.

Application March 11, 1931. Serial No. 521,660

11 Claims. (Cl. 170—163)

The present application is an improvement on the subject matter of my application filed February 15, 1930, Ser. No. 428,675.

It is one object of the invention to provide a structure of the character indicated that produces a balance in pressures doing away with the necessity of supplying any bearing to withstand the thrust produced by the moment of centrifugal force tending to turn the blades about their longer axes and into their plane of revolution.

It is another object of the invention to provide a structure of the character indicated wherein the transmission mechanism for varying the pitch of the blades is small enough to allow emplacement on the geared 1570 Curtiss engines now in use.

It is still another object of the invention to build an adequate structure for the purpose indicated, and of the character indicated, without excessive weight.

In the drawings:

Figure 3 is a sectional view through the propeller adjusting means, parts broken away.

Figure 4 is a plan view of a portion of the blade adjusting means.

Figure 5 is a fragmental section of the adjusting rod enclosure.

Figure 6 is a view on line 6—6 of Figure 3, parts broken away.

Figure 1:
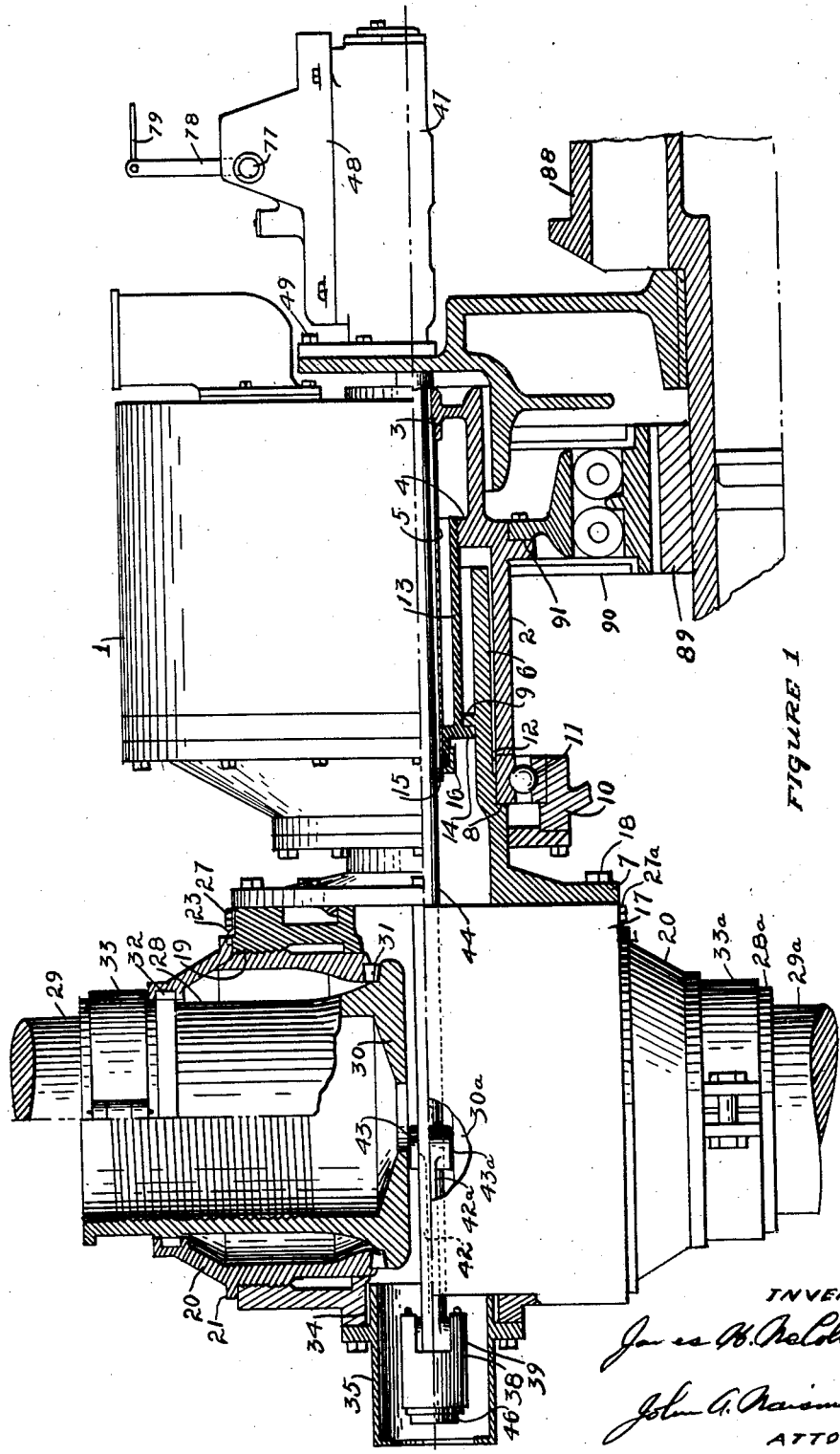
Figure 1 is a side elevation of a structure embodying my invention, partly in section and parts broken away.
Figure 2:
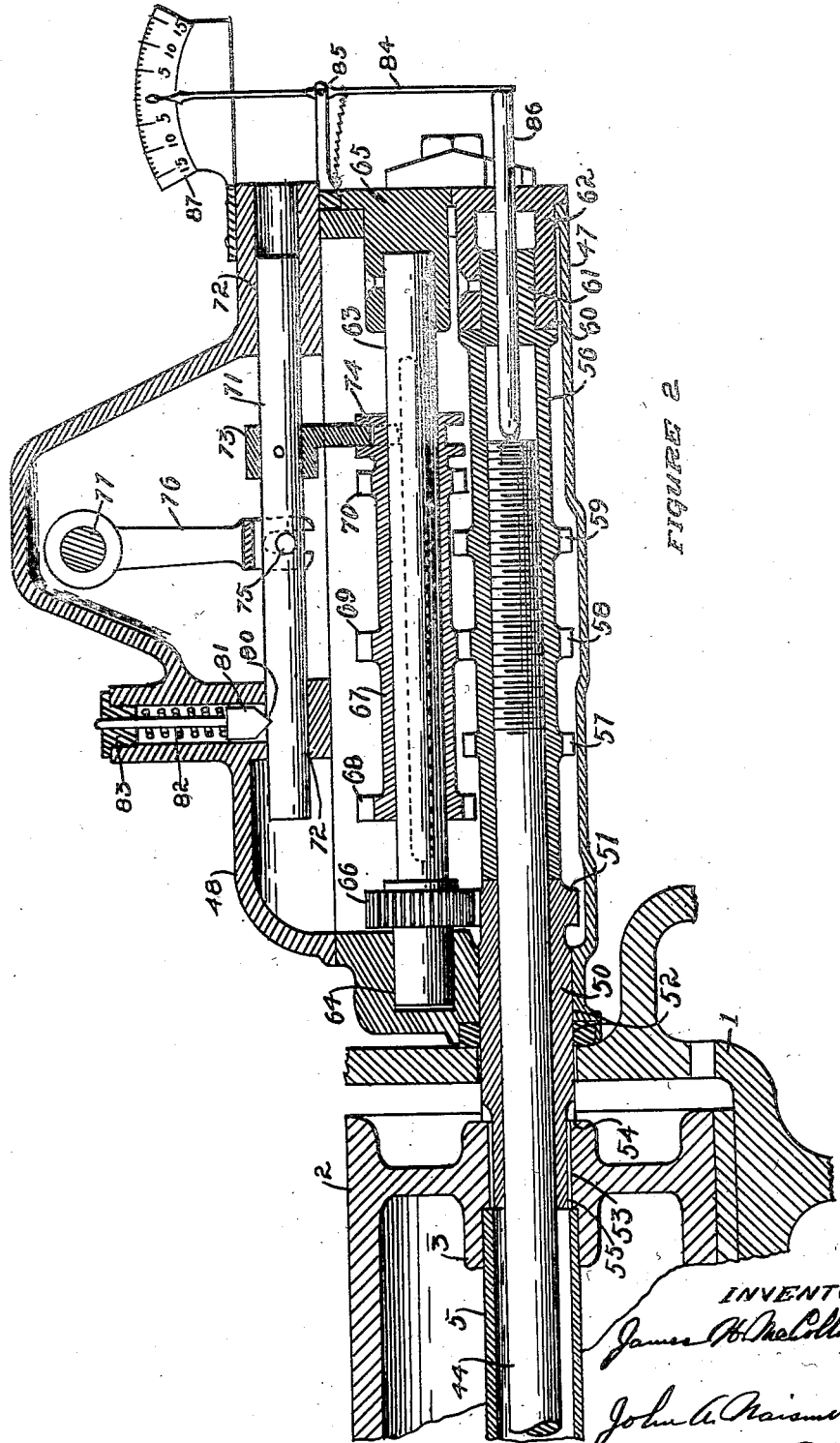
Figure 2 is a sectional view through the transmission mechanism.

In the embodiment of the invention as herein disclosed a portion of a geared 1570 Curtiss engine is shown at 1. In placing the mechanism hereinafter described the central rib at the back of the propeller drive gear housing is removed, otherwise no change is made in the engine case, or bearings, or gears. There is also no change necessary in the location of the propeller center line.

The mechanism is emplaced on the engine in the following manner:

The original propeller shaft having been removed, I assemble in its place a hollow shaft member 2 provided with a boss 3 at its inner end and an inwardly directed threaded flange 4 adjacent said inner end. A heavy-walled steel tube 5 is centrally disposed within the shaft and pressed into boss 3. At 6 is a second shaft member having an outwardly directed flange 7 on its forward end, a shoulder 8 formed thereon adjacent its forward end, and provided with an inwardly directed flange as at 9. At 10 is a nose housing with a ball bearing assembly at 11 mounted on shaft portion 6, the bearings being firmly seated between shoulder 8 and the end of shaft portion 2 when the splines 12 of portion 6 are pressed home into shaft portion 2. A tubular member 13 is now slipped over tube 5 and screwed into flange 4 until the shoulder 14 thereon seats solidly against flange 9. A bushing 15 is pressed into the end of tube 5, and a nut 16 is screwed on to the end of member 13 to compress packing material placed therebetween.

The engine is now completely assembled and ready for the propeller emplacement.

A propeller hub is shown at 17 mounted on flange 7 as at 18 and provided with diametrically opposite threaded openings 19 to receive bearing supports as 20. Each support 20 is a hub-like element having a flange as 21 overlying hub 17 and provided with notches 22. A locking washer is provided at 23, said washer having a lip 24 adapted to engage a notch 22 and fingers 25 adapted to engage holes 26 in hub 17. The washer is held in place by cap screw 27.

A blade sleeve is shown at 28 threaded to engage a propeller blade 29 and having a head 30 on its inner end. Tapered rollers are inserted between head 30 and support 20 as at 31, and straight rollers 32 are inserted between the outer portion of the sleeve and support 20.

An opening 34 is formed in the outer end of hub 17 in axial alignment with tube 5 and over this opening is mounted a cylinder 35 closed with a cap 36. At 37 is a piston terminating in shoes 38 slidably engaging the cylinder 35 and having inwardly extending side portions 39 fitted with bearing pins 40—40a secured by cotter pins 41—41a. Connecting rods 42—42a are mounted on pins 40—40a and on bearing pins 43—43a on opposite sides of the axes of the opposing heads 30—30a of the propeller sleeves. The control rod 44 passes through the piston 37 with its head 45 seated thereon and held by a locknut 46.

The transmission and adjusting mechanism comprises a case 47 with a cover 48 mounted upon the engine in any suitable manner as at 49 immediately to the rear of shaft member 2. At 50 is a shaft provided with a gear 51 which is positioned by dropping into case 47 and pressed forwardly through bearing 52 into broached hole 53 in shaft 2 and tapped firmly into place until its shoulder 54 seats against shaft 2. This shaft forms a bearing for rod 44 and is provided with splines at 55. At 56 is an internally threaded shaft adapted to engage the threaded end of rod 44 and having three gears formed thereon at 57, 58, and 59, and having a shoulder 60 and a bearing portion 61 formed on its outer end. A bushing 62 is mounted in the end of case 47 to engage shaft 56 and form a bearing therefor.

At 63 is a shaft mounted in bearing 64 in one end of case 47 and in bushing 65 in the other end and carrying a gear 66 meshing with gear 51. On the feathered shaft 63 is slidably mounted a sleeve 67 provided with gears 68, 69 and 70 movable into and out of engagement with gears 57, 58 and 59.

In the cover 48 is slidably mounted a shaft 71 in bearings 72, said shaft having a shifting fork 73 pinned thereto to engage a collar 74 formed on sleeve 67, said shaft having a pin 75 passing therethrough. A second shifting fork is shown at 76 in engagement with pin 75 and mounted on a shaft 77 journaled in cover 48 and provided with a lever 78 operated in any suitable manner by a push-and-pull rod 79. The shaft 71 has a notch 80 formed therein to receive a plunger pin 81 in cover 48 advanced by a spring 82 reacting against a cap 83.

It being assumed that the two parts 17 to 33 and 47 to 83 have been assembled as described, the connecting rods are mounted upon the opposing ends of the blade sleeves 28—28a and upon the piston 37 and then the cylinder 35 is placed in position. The control rod 44 is now passed through piston 37, bushing 15, tube 5, shaft 50, and screwed into the internally threaded gear shaft 56. The rod 44 is screwed into shaft 56 until the piston 37 is advanced to such a position that it may be advanced or retracted sufficiently to move bearing pins 43—43a through an arc of fifteen degrees in either direction. When adjusted as desired the lock nut 46 is screwed up against the head of rod 44 and locked, after which cap 36 is placed in position.

In order to secure perfect balancing of the two propeller blade assemblies the sleeves 28—28a are screwed down into position through the medium of supports 20—20a until only a .015 thickness gauge can be placed between flanges 21—21a and hub 17. When both supports have been thus emplaced the thickness gauges are removed and they are screwed inwardly toward each other one notch 22 at a time until the ends of bearing pins 43—43a touch the smooth end surfaces of the opposite sleeve 28a—28 respectively. Locking washer 23 is now placed in position, the cap screw 27 inserted and tightened, and the outer lip of washer 23 pressed up to lock the same.

A gauge may be provided for indicating the movement of rod 44 by pivoting a lever as 84 at a point 85 with one end contacting the end of pin 86 inserted through bushing 62 and the other end overlying a dial 87.

When the structure has been assembled as above set forth the propeller blades may be adjusted as desired in the following manner, all of the gears in the case 47—48 being of sixteenth pitch, and gears 51, 66, 58 and 69 having thirteen teeth each, gear 68 having fourteen teeth, gear 57 having twelve teeth, gear 70 having twelve teeth, and gear 59 having fourteen teeth.

Normally gears 51 and 66, and 58 and 69 are in mesh and cooperate to hold shaft 56 at the same speed of rotation as shaft 50, which is propeller shaft speed, and the end thrust of shaft 56 against shaft 50 is transmitted to shaft 2, all rotating at the same speed. It is clear that control rod 44, which is threaded into shaft 56, remains stationary in the threads. It is also clear that no load is placed upon the teeth of gears 51, 66, 58 and 69 as they simply cooperate to keep parts 56 and 67 rotating at the same speed.

To decrease the pitch of the propeller blades the engine is throttled to idling position, and gear 70 is shifted into engagement with gear 59. Since gear 70 has twelve teeth and gear 59 has fourteen teeth, threaded shaft 56 is caused to rotate a trifle slower than rod 44 thereby pulling the same 1.43 threads (twenty threads per inch) in ten propeller revolutions and rotating sleeves 28—28a equal distances in opposite directions through the medium of piston 37 and connecting rods 42—42a. When the desired decrease in pitch is secured the gears are shifted back again with gears 58 and 69 in mesh and full throttle may be used with the decreased propeller pitch.

To increase the pitch of the propeller blades the engine is throttled to idling position and fourteen tooth gear 68 is shifted into engagement with twelve tooth gear 57 and shaft 56 is rotated a trifle faster than rod 44 thereby pushing the same 1.43 threads in ten revolutions. When the desired increase in pitch has been reached the gears are shifted back again with gears 58 and 69 in mesh and full throttle may be used.

It is important in this construction that the engine be idled when changing pitch, since the gears will shift easily when the end thrust of shaft 56 against part 50 is removed. Shifting should not be attempted when the aerodynamic forces are cooperating with centrifugal forces to create a heavy end thrust between parts 56 and 50.

The engaging parts 80—81 normally hold the engaging gears 58—69 in mesh but readily disengage to permit shifting of shaft 71.

While the part 37 is referred to as a piston carrying shoes 38, any desired form of structure may be used to secure a sliding contact with cylinder 35 if means is provided to permit the passage of air to and from the chamber between the sliding head and the closed end of cylinder 35.

The portions of engine 1 shown in section are the crank shaft 88 carrying a pinion 89 meshing with the propeller drive gear assembly 90, the connection to shaft 2 at 91 being in the same relation thereto as to the original propeller drive shaft.

The most important result obtained by means of the construction disclosed is that it eliminates the necessity of providing the usual thrust bearing to withstand the thrust produced by the moment of centrifugal force tending to turn the propeller blades into their plane of revolution.

When the propeller is in full operation the forces tending to turn the blade assemblies on their bearings place the connecting rods 42—42a under compression and consequently place the control rod 44 under a tensional strain, but when such forces are not acting on the blades, as when the engine is idling, then no tensional strains are acting on rod 44. In the latter case there is no material end thrust of shaft 56 on 51 and consequently it may be rotated relative thereto for effecting the longitudinal adjustment of rod 44, friction between the parts developing only for the short period required to effect the required adjustment. When, however, the propeller is in full operation the tensional strain on rod 44 is conveyed through shafts 56 and 50 to propeller shaft 2, these parts all rotating as a unit, the end thrust of shaft 50 being applied to shaft 2 through the medium of shoulder 54. Since the propeller is also a unitary part of shaft 2 the thrust is projected forwardly thereto to balance the force referred to developed therein.

The forces tending to turn the blades into their plane of revolution, when cooperating with aerodynamic forces, result in forces of such magnitude that those not skilled in the art would not be able to visualize them. For example, on a propeller of ten and one-half feet diameter the co-operation of these forces tending to turn the blades into their plane of revolution when the propeller is driven at a speed of 1800 R. P. M. would be in excess of four thousand pounds for each blade, thereby placing a tensional strain of eight thousand pounds on rod 44.

It is apparent that by conveying this force directly to the shaft 2 the necessity of providing an excessively large and heavy thrust bearing is eliminated.

It is to be understood, of course, that while I have herein shown and described but one specific embodiment of the invention, changes in form, construction, and method of assembly and operation, may be made within the scope of the appended claims.

I claim:

1. In a variable pitch propeller, a hub, a pair of axially adjustable propeller blade assemblies mounted therein, gauge means mounted upon the opposing ends of said assemblies whereby to determine the limits of their inward adjustments at points equally spaced on opposite sides of the axis of revolution of the hub, means for measuring the inward movement of each assembly toward said gauge means, and means for adjusting said assemblies about their longitudinal axes.

2. In a variable pitch propeller, a hub, a pair of axially adjustable propeller blade assemblies mounted therein, gauge means mounted upon the opposing ends of said assemblies whereby to determine the limits of their inward adjustments at points equally spaced on opposite sides of the axis of revolution of the hub, identical step-by-step means for measuring the inward movement of each assembly toward said gauge means, and means for adjusting said assemblies about their longitudinal axes.

3. In a variable pitch propeller, a hub, a pair of oppositely disposed bearing members mounted therein for longitudinal adjustment along a common axis, locking means inserted between each member and the hub, a propeller sleeve revolubly mounted in each member having a flange formed on its inner end overlying the adjacent end of the member, roller bearings inserted between the flange and member, roller bearings inserted between the outer portion of the sleeve and said member, a propeller blade mounted in each sleeve, and means for adjusting the sleeves about their longitudinal axes.

4. In a variable pitch propeller, a hub, a pair of oppositely disposed propeller blade assemblies mounted therein for adjustment about their longitudinal axes, a cylinder mounted on the hub in axial alignment with its axis of rotation, a head member having a pair of oppositely disposed shoes thereon slidably mounted in the cylinder, a connecting rod pivotally connected to the inner end of each blade assembly and to said head member, a control rod mounted in the head member, and means for moving the control rod longitudinally.

5. In a variable pitch propeller, the combination of a power driven hollow propeller shaft, angularly adjustable blades mounted thereon, a control rod passing therethrough, adjusting means connecting the blades and rod, a second shaft revolubly mounted adjacent the rod at the end remote from the propeller blades, means connecting the rod and shaft to the power shaft to effect their rotation at the same speed, and means actuated by the second shaft for setting up a momentary variation in the speed of rotation of the rod and power shaft, and means for moving the rod longitudinally during said differentiation in speeds.

6. In combination, a hollow propeller shaft and driving means therefor, angularly adjustable blades mounted on one end thereof, and adjusting means for the blades including a longitudinally adjustable rod passing through the shaft, a revoluble sleeve threaded on the rod and supported against longitudinal movement, a second shaft geared to the propeller shaft to rotate at a uniform speed therewith, and a shiftable variable speed driving connection between the second shaft and sleeve whereby the sleeve may be rotated at the same speed, or at a greater or lesser speed than the propeller shaft, thereby holding the rod against movement or shifting it longitudinally in either direction.

7. In combination, a hollow propeller shaft and driving means therefor, angularly adjustable blades mounted on one end thereof, and adjusting means for the blades including a longitudinally adjustable rod passing through the shaft, a revoluble sleeve threaded on the rod and supported against longitudinal movement, a second shaft geared to the propeller shaft to rotate at a uniform speed therewith, a shiftable sleeve mounted on the second shaft to rotate therewith, and geared to the first sleeve to rotate at a uniform speed therewith, the said sleeves being also provided with two sets of normally disengaged gears adapted to rotate the first sleeve faster or slower than the second sleeve when the second sleeve is shifted to engage one or the other set whereby to move the adjustable rod longitudinally in either direction, and means for shifting the second sleeve to effect the engagement of either set of gears.

8. In a variable pitch propeller, a hollow propeller shaft, a hub mounted thereon, rotatable propeller blade assemblies mounted in the hub, a control rod passing through the shaft and connected to the said assemblies to control rotation thereof, means for effecting adjustment of the control rod, and means for transforming the tensional strain exerted upon the control rod by forces tending to rotate said assemblies into thrust forces acting upon said assemblies.

9. In a variable pitch propeller, a hub, a pair of propeller blades revolubly mounted therein, and means for balancing the thrust produced by the moment of centrifugal force tending to turn the blades into their plane of revolution, including a control rod connected to said blades and adapted to be placed under tensional strain by said force, and means for transforming the tensional strain exerted upon the rod into thrust forces acting upon the blades.

10. In a variable pitch propeller, a hollow propeller shaft, a hub mounted thereon, a pair of propeller blades revolubly mounted in the hub, a control rod passing through said shaft, means for adjustably supporting the rod against longitudinal movement relative to the shaft, and connections between the rod and blades whereby the thrust produced by the moment of centrifugal force tending to turn the blades into their plane of revolution will be projected through the rod and shaft and back to the blades.

11. In a variable pitch propeller, a hollow propeller shaft, a hub mounted thereon, a pair of propeller blades revolubly mounted in the hub, a control rod passing through the shaft, a member mounted on the rod exteriorly of the shaft and bearing against the end thereof and rotating as a unit therewith, a second member threaded on the rod and bearing against said first member, a shiftable variable speed driving connection between the two members whereby said members may be connected to rotate at the same or unequal speeds, and connections between the rod and blades whereby the thrust produced by the moment of centrifugal force tending to turn the blades into their plane of revolution will be projected through the rod and members back to the shaft.

JAMES H. McCOLLOUGH.